(12) United States Patent
Tong et al.

(10) Patent No.: US 11,110,427 B1
(45) Date of Patent: Sep. 7, 2021

(54) POLYLACTIC ACID POLYMERIZATION REACTION APPARATUS AND SYSTEM

(71) Applicants: COFCO (jilin) Bio-Chemical Technology CO., Ltd, Changchun (CN); Jilin COFCO Biomaterial Co., Ltd, Changchun (CN); COFCO BIOTECHNOLOGY CO., LTD, Bengbu (CN)

(72) Inventors: Yi Tong, Beijing (CN); Yi Li, Beijing (CN); Zhigang Liu, Changchun (CN); Kejia Xu, Beijing (CN); Guoxing Zhao, Changchun (CN); Lida Wu, Changchun (CN); Kai Yang, Beijing (CN)

(73) Assignees: COFCO (JILIN) BIO-CHEMICAL TECHNOLOGY CO., LTD, Changchun (CN); JILIN COFCO BIOMATERIAL CO., LTD., Changchun (CN); COFCO BIOTECHNOLOGY CO., LTD., Bengbu (CN)

( * ) Notice: Subject to any disclaimer, the term of this patent is extended or adjusted under 35 U.S.C. 154(b) by 0 days.

(21) Appl. No.: 17/137,007

(22) Filed: Dec. 29, 2020

(30) Foreign Application Priority Data

Apr. 29, 2020 (CN) .......................... 202010358345.X

(51) Int. Cl.
*B01J 19/00* (2006.01)
*B01J 19/06* (2006.01)
(Continued)

(52) U.S. Cl.
CPC ......... *B01J 19/087* (2013.01); *B01J 19/0013* (2013.01); *B01J 19/0066* (2013.01);
(Continued)

(58) Field of Classification Search
CPC .... B01J 19/00; B01J 19/0006; B01J 19/0013; B01J 19/053; B01J 19/0066; B01J 19/06;
(Continued)

(56) References Cited

FOREIGN PATENT DOCUMENTS

| CN | 2605260 Y | 3/2004 |
|---|---|---|
| CN | 2641046 Y | 9/2004 |

(Continued)

*Primary Examiner* — Natasha E Young
(74) *Attorney, Agent, or Firm* — Volpe Koenig

(57) ABSTRACT

The present invention relates to the technical field of polylactic acid preparation, and discloses polylactic acid polymerization reaction apparatus and system. The polylactic acid polymerization reaction apparatus comprises a polymerization reactor and an agitating assembly arranged in a flow channel of the polymerization reactor, wherein the agitating assembly comprises an electromagnetic winding mechanism and a magnetic induction element, the electromagnetic winding mechanism is arranged along the inner wall of the polymerization reactor around the magnetic induction element, with clearance formed between the electromagnetic winding mechanism and the magnetic induction element, so that the magnetic induction element and the electromagnetic winding mechanism can induce electromagnetic induction, and thereby the magnetic induction element can rotate around its own axis; a threaded groove is formed on the magnetic induction element. The polylactic acid polymerization reaction apparatus provided by the present invention can improve the polymerization effect and thereby improve the product conversion ratio.

9 Claims, 1 Drawing Sheet

(51) Int. Cl.
 *B01J 19/08* (2006.01)
 *B01J 19/18* (2006.01)
 *C08G 63/08* (2006.01)

(52) U.S. Cl.
 CPC ........... *B01J 19/06* (2013.01); *B01J 19/1837* (2013.01); *C08G 63/08* (2013.01); *B01J 2219/00092* (2013.01); *B01J 2219/0854* (2013.01); *B01J 2219/0858* (2013.01)

(58) Field of Classification Search
 CPC . B01J 19/08; B01J 19/087; B01J 19/18; B01J 19/1812; B01J 19/1837; B01J 2219/00; B01J 2219/00049; B01J 2219/00051; B01J 2219/00074; B01J 2219/00087; B01J 2219/00092; B01J 2219/08; B01J 2219/0803; B01J 2219/085; B01J 2219/0854; B01J 2219/0858; C08G 63/00; C08G 63/02; C08G 63/06; C08G 63/08
 See application file for complete search history.

(56) References Cited

FOREIGN PATENT DOCUMENTS

| | | |
|---|---|---|
| CN | 1754897 A | 4/2006 |
| CN | 202415425 U | 9/2012 |
| CN | 104494062 A | 4/2015 |

POLYLACTIC ACID POLYMERIZATION REACTION APPARATUS AND SYSTEM

CROSS REFERENCE TO RELATED APPLICATIONS

This application claims priority to Chinese Application No. 202010358345.X, filed on Apr. 29, 2020, entitled "Polylactic acid polymerization reaction device and system", which is specifically and entirely incorporated by reference.

FIELD OF THE INVENTION

The present invention relates to the technical field of polylactic acid preparation, in particular to polylactic acid polymerization reaction apparatus and system.

BACKGROUND OF THE INVENTION

A conventional polylactic acid polymerization apparatus usually employs a thin-film reactor, in which special-shaped parts are arranged. Laminar flow is formed and a horizontally pushing effect is achieved as the melt of polymerization moves from bottom to top. This polymerization arrangement realizes continuous polymerization, but the apparatus has slow conveying speed and low production efficiency owing to the high viscosity of the melt; the additives and the melt are not dispersed uniformly, and the product conversion ratio is low; moreover, in the process of laminar flow, some melt stays near the surfaces of the container, and the reaction times of the materials vary significantly. Some materials can't react completely, while other materials are degraded due to long retention time, which eventually results in wide overall molecular weight distribution of the melt and compromised product quality.

On one hand, the utility model application CN03228796.8 discloses an apparatus for preparing polylactic acid by direct polycondensation of lactic acid, the utility model application CN 03255460.5 discloses a polymerization apparatus for preparing polylactic acid by direct polycondensation of lactic acid, and the utility model application CN 201220058753.4 discloses a system for preparing polylactic acid by polycondensation. In the above-mentioned patents, the reactor is mainly composed of glass instruments such as three-necked flask and condenser tube, etc., but the reactor is only used for laboratory research and can't meet the requirements of practical industrial application.

On the other hand, at present, some improved polylactic acid polymerization apparatuses in the market usually employ vertical and kettle-type agitation to drive the melt to polymerize with additives. The melt flow direction can only follow the direction of rotation the agitator, and the melt reaction temperatures and times at different interfaces are inconsistent, resulting in wide molecular weight distribution of polylactic acid chips. Moreover, since there is no circulation device in the polymerization process, the reaction between the melt and the additives is incomplete, causing a compromised product conversion ratio and high production cost.

Content of the Invention

The object of the present invention is to provide a polylactic acid polymerization reaction apparatus, in order to solve the problem that there is no polylactic acid polymerization reaction apparatus that achieves a high product conversion ratio and high product quality in the prior art.

To attain the above-mentioned object, in a first aspect, the present invention provides a polylactic acid polymerization reaction apparatus, comprising a polymerization reactor and an agitating assembly arranged in a flow channel of the polymerization reactor, wherein the agitating assembly comprises an electromagnetic winding mechanism and a magnetic induction element, the electromagnetic winding mechanism is arranged along the inner wall of the polymerization reactor around the magnetic induction element, with clearance formed between the electromagnetic winding mechanism and the magnetic induction element, so that the magnetic induction element and the electromagnetic winding mechanism can induce electromagnetic induction, and thereby the magnetic induction element can rotate around its own axis; a threaded groove is formed on the magnetic induction element.

Preferably, the magnetic induction element is in a cylindrical shape, and the axis of the magnetic induction element and the axis of the polymerization reactor are in the same line.

Preferably, the electromagnetic winding mechanism comprises a coil former and an electromagnetic coil wound on the coil former, wherein the coil former is annular and fixedly arranged on the inner wall of the polymerization reactor.

Preferably, the magnetic induction element comprises a main body portion and a tip portion, which are sequentially arranged in a melt flow direction, wherein the main body portion is cylindrical, and the tip portion is conical and tapered in the melt flow direction.

Preferably, the tip portion protrudes from the electromagnetic winding mechanism.

Preferably, the polylactic acid polymerization apparatus further comprises a circulation pipe, and a static mixer and a circulation pump that are arranged on the circulation pipe, and the two ends of the circulation pipe are respectively in fluid communication with the portions of the polymerization reactor at the two sides of the agitating assembly.

Preferably, the magnetic induction element is made of 38CrMoAl material.

Preferably, the polymerization reactor comprises an outer shell and an inner shell, a heat exchange liquid circulation cavity is formed between the outer shell and the inner shell, a heat exchange liquid inlet and a heat exchange liquid outlet in communication with the heat exchange liquid circulation cavity are arranged on the outer shell, and the agitating assembly is arranged in the inner shell.

Preferably, the polymerization reactor is arranged vertically, and comprises a melt inlet at the bottom and a melt outlet at the top.

Ina second aspect, the present invention provides a polylactic acid polymerization system, which comprises the polylactic acid polymerization apparatus described above.

With the technical scheme, in the polylactic acid polymerization reaction apparatus provided by the application, the melt enters the polymerization reactor and is finally outputted from the polymerization reactor under the driving action of the pump, a polymerization reaction happens under the conditions of temperature and pressure in the polymerization reactor, the agitating assembly is arranged in the flow channel of the polymerization reactor, and electromagnetic induction is induced between the magnetic induction element and the electromagnetic winding mechanism, so that the magnetic induction element can be arranged between the electromagnetic windings. By supplying power to the electromagnetic winging mechanism and cutting off the power supply to the electromagnetic winging mechanism, the magnetic induction element can rotate around its own axis when the electromagnetic winging mechanism is in an energized state or de-energized state. Since the melt passes through the clearance between the magnetic induction element and the electromagnetic winding mechanism and the surface of the magnetic induction element is provided with a threaded groove, the melt is agitated by the magnetic induction element; under the action of agitation in conjunction with the flow pressure of the melt, the melt pulsates periodically in the axial direction, thus periodic volumetric pulsating deformation and transportation of the melt are realized, and the uniformity of the molecular weight is ensured; the retention time of the polylactic acid melt is shortened in the process of pulsating deformation and extrusion, thus the material is not easy to decompose, and thereby the effect of polymerization reaction is improved and the product conversion ratio is increased.

REFERENCE NUMBERS

Figure 1:
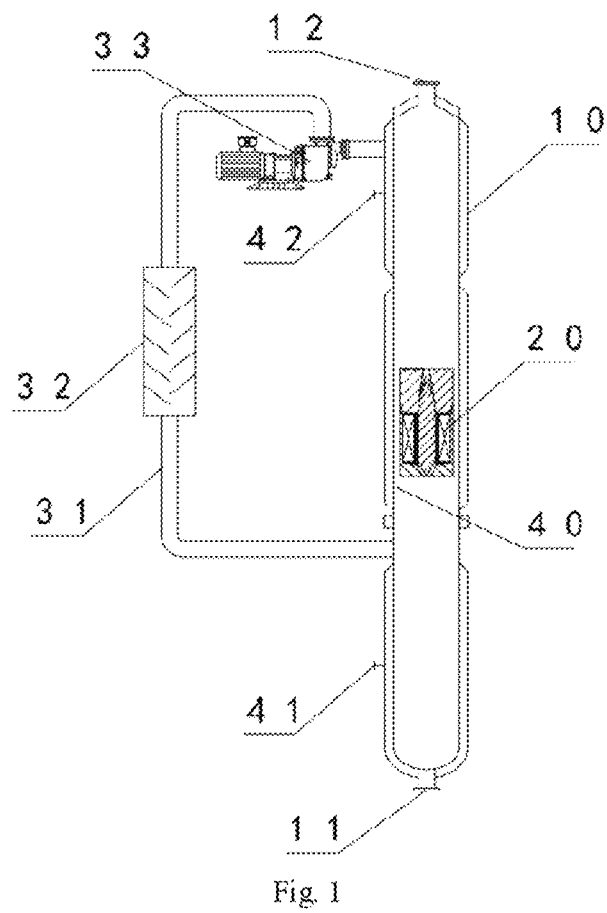
FIG. 1 is a schematic diagram of the polylactic acid polymerization reaction apparatus provided in a preferred embodiment of the present invention.

10—polymerization reactor; 11—melt inlet; 12—melt outlet
20—agitating assembly; 21—magnetic induction element; 22—coil former; 23—electromagnetic coil; 24—magnetic isolation sleeve
31—circulation pipe; 32—static mixer; 33—circulation pump
40—heat exchange liquid circulation cavity; 41—heat exchange liquid inlet; 42—heat exchange liquid outlet.

DETAILED DESCRIPTION OF THE EMBODIMENTS

Hereunder some embodiments of the present invention will be detailed with reference to the accompanying drawings. It should be understood that the embodiments described herein are only provided to describe and explain the present invention rather than constitute any limitation to the present invention.

The present invention provides a polylactic acid polymerization reaction apparatus, which comprises a polymerization reactor 10 and an agitating assembly 20 arranged in a flow channel of the polymerization reactor 10, wherein the agitating assembly 20 comprises an electromagnetic winding mechanism and a magnetic induction element 21, the electromagnetic winding mechanism is arranged along the inner wall of the polymerization reactor 10 around the magnetic induction element 21, with clearance formed between the electromagnetic winding mechanism and the magnetic induction element 21, so that the magnetic induction element 21 and the electromagnetic winding mechanism can induce electromagnetic induction, and thereby the magnetic induction element 21 can rotate around its own axis; a threaded groove is formed on the magnetic induction element 21.

The melt enters the polymerization reactor 10 and is finally outputted from the polymerization reactor 10 under the driving action of the pump, a polymerization reaction happens under the conditions of temperature and pressure in the polymerization reactor. In the present application, the agitating assembly 20 is arranged in the flow channel of the polymerization reactor 10, and electromagnetic induction is induced between the magnetic induction element 21 and the electromagnetic winding mechanism, so that the magnetic induction element 21 can be arranged between the electromagnetic windings. The magnetic induction element 21 can both rotate around its own axis when the electromagnetic winging mechanism is in an energized state or de-energized state. Since the melt passes through the clearance between the magnetic induction element 21 and the electromagnetic winding mechanism and the surface of the magnetic induction element 21 is provided with a threaded groove, the melt is agitated by the magnetic induction element; under the action of agitation in conjunction with the flow pressure of the melt, the melt pulsates periodically in the axial direction, thus periodic volumetric pulsating deformation and transportation of the melt are realized, and the uniformity of the molecular weight is ensured; the retention time of the polylactic acid melt is shortened in the process of pulsating deformation and extrusion, thus the material is not easy to decompose, and thereby the effect of polymerization reaction is improved and the product conversion ratio is increased.

As shown in FIG. 1, the polymerization reactor 10 is cylindrical and arranged vertically, the axis of the magnetic induction element 21 and the axis of the polymerization reactor 10 are in the same line, the polymerization reactor is provided with a melt inlet 11 at the bottom and a melt outlet 12 at the top. In a preferred embodiment, the agitating assembly 20 is arranged closer to the melt inlet 11 at the bottom, for example, the distance between the center of the agitating assembly 20 and the melt inlet 11 is set to one third of the total length of the polymerization reactor 10.

A main shaft extending in the vertical direction is provided in the polymerization reactor 10, and the magnetic induction element 21 is sleeved on the main shaft. In a preferred embodiment, the magnetic induction element 21 is sleeved on the main shaft via a bearing, the inner ring of the bearing is fixedly connected with the main shaft, for example, by bolts, the outer ring of the bearing can support the magnetic induction element 21 so as to hold the magnetic induction element 21 in the annular electromagnetic winding mechanism, and the magnetic induction element 21 can rotate relative to the main shaft when it rotates, which is say, the magnetic induction element rotates but the main shaft is stationary; in another preferred embodiment, the main shaft is rotatably arranged in the polymerization reactor 10, and the magnetic induction element 21 is fixedly arranged on the main shaft, thus the magnetic induction element 21 and the main shaft rotate together when the magnetic induction element 21 rotates.

Figure 2:
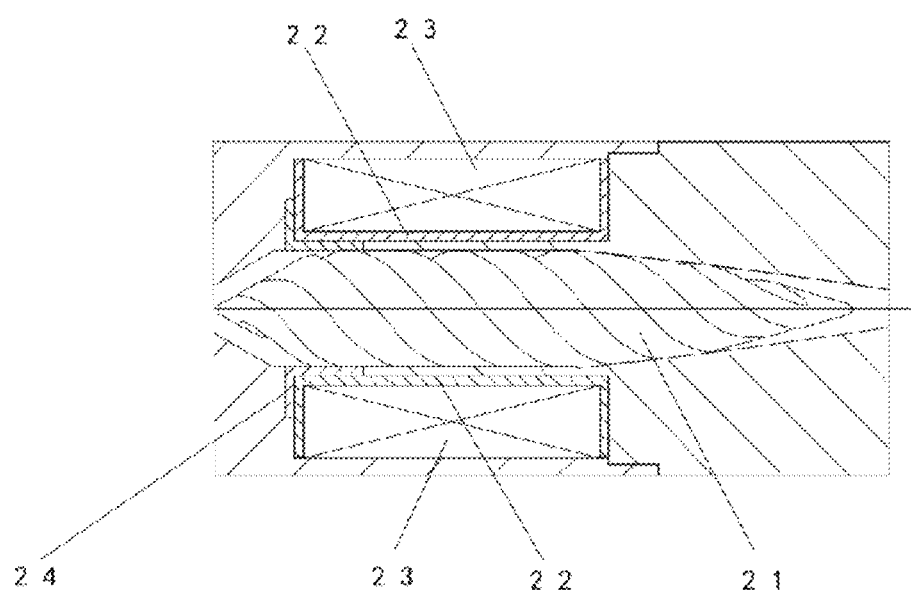
FIG. 2 is a partial schematic diagram of the polylactic acid polymerization apparatus in FIG. 1, showing the structure of the agitating assembly.

As shown in FIG. 2, the electromagnetic winding mechanism comprises a coil former 22 and an electromagnetic coil 23 wound on the coil former 22, wherein the coil former 22 is ring-shaped to match the inner diameter of the polymerization reactor 10 and can be fixed on the inner wall of the polymerization reactor by connecting with bolts or screws or bonding. The magnetic induction element 21 comprises a main body portion and a tip portion, which are sequentially arranged in a melt flow direction, wherein the main body portion is cylindrical, and the tip portion is conical and tapered in the melt flow direction, and protrudes from the electromagnetic winding mechanism. The cylindrical main body enables the magnetic induction element 21 to intensively agitate the melt passing through the clearance as the magnetic induction element rotates, and the tip portion protruding from the coil former 22 ensures the fluidity of the melt after the melt is discharged through the clearance. The magnetic induction element 21 is an integral element made of 38CrMoAl, and is a solid element.

An electric controller is installed outside the polymerization reactor, and supplies power to the electromagnetic coil through wires and can control the connection and disconnection of the circuit. The wires may pass through the outer shell of the polymerization reactor and thereby are electrically connected with the electromagnetic coil; alternatively, conductive bolts may be arranged on the outer shell of the polymerization reactor to supply power to the electromagnetic coil in the polymerization reactor.

In addition, in order to avoid short circuit caused by direct contact between the magnetic induction element and the electromagnetic coil, a magnetic isolation sleeve 24 is arranged outside the electromagnetic winding mechanism. The magnetic isolation sleeve 24 is located between the magnetic induction element 21 and the electromagnetic coil 23. The magnetic isolation sleeve is made of a high magnetic permeability material with magnetic permeability between 80,000 and 350,000, and can be directly sleeved on the electromagnetic winding mechanism.

To ensure the heat exchange effect of the polymerization reactor, as shown in FIG. 1, the polymerization reactor 10 comprises an outer shell and an inner shell, a heat exchange liquid circulation cavity 40 is formed between the outer shell and the inner shell, a heat exchange liquid inlet 41 and a heat exchange liquid outlet 42 in communication with the heat exchange liquid circulation cavity 40 are arranged on the outer shell, and the agitating assembly 20 is arranged in the inner shell. A heat exchange liquid may be introduced into the heat exchange liquid circulation cavity 40 via the heat exchange liquid inlet 41 and the heat exchange liquid outlet 42, so that the heat exchange liquid can exchange heat with the melt in the inner shell and the temperature of the melt can be increased.

More preferably, as shown in FIG. 1, the polylactic acid polymerization reactor provided by the present application further comprises a circulation pipe 31, and a static mixer 32 and a circulation pump 33 that are arranged on the circulation pipe 31, wherein the two ends of the circulation pipe 31 are respectively in fluid communication with the portions of the polymerization reactor 10 at the two sides of the agitation assembly 20. After a batch of melt enters the polymerization reactor 10 through the melt inlet 11, the melt inlet 11 is closed and the melt outlet 12 is kept closed. At that point, under the action of the circulation pump 33, the melt circulates between the polymerization reactor 10 and the circulation pipe 31, and passes through the static mixer 32 in each cycle. A plurality of rectangular baffles arranged alternately are provided in the static mixer, and the rectangular baffles are provided with through-holes, such as round holes in 10 cm diameter, so as to properly block the melt and ensure uniform mixing of the additives and the melt, thereby the efficiency of mixing of the additives and the melt is improved, and the polymerization effect is further improved.

The melt can circulate in the polymerization reactor 10 and the circulation pipe 31 repeatedly. By controlling whether to energize the electromagnetic winding mechanism of the agitating assembly or not, the direction of self-rotation of the magnetic induction element 21 can be controlled. The direction of self-rotation of the magnetic induction element 21 is reversed when the electromagnetic winding mechanism is switched between energized state and de-energized state. In use, the electromagnetic winding mechanism may be energized for a time period and then de-energized for another time period, so that the melt can be agitated in different directions and the polymerization effect can be improved.

Molten lactide, catalyst, initiator and high-efficiency composite stabilizer are introduced into the polymerization reactor. Under the conditions of 6 Mpa pressure and 190-200° C. temperature, the melt is kept between the polymerization reactor 10 and the circulation pipe 31 for reaction, e.g., for 3 h. During that time period, the current introduced into the agitating assembly in the energized state is 20-30 A, and the energized time and de-energized time of the agitating assembly are taken as variables; then, the result shown in Table 1 is obtained.

TABLE 1

| Current (I) | Energized Time (t) | De-energized Time (t) | Polydispersity Index (PDI) | Conversion Ratio (%) |
|---|---|---|---|---|
| 0A | 0 h | 3 h | 1.47 | 94.5 |
| 20A | 3 h | 0 h | 1.35 | 95 |
| 22A | 2.5 h | 0.5 h | 1.15 | 96.2 |
| 24A | 2 h | 1 h | 1.29 | 95.7 |
| 26A | 1.5 h | 1.5 | 1.32 | 95.8 |
| 28A | 1 h | 2 h | 1.39 | 95.3 |
| 30A | 0.5 h | 2.5 h | 1.32 | 94.8 |
| Polylactic acid resin in conventional polymerization process | | | 1.56 | 93.6 |

It is seen from the above table: the minimum polydispersity index (PDI) of PLA chips produced by the polylactic acid polymerization reaction apparatus provided in the present application is 1.15, while the PDI of PLA chips produced through the existing conventional polymerization process is 1.56.

In a second aspect, the present application provides a polylactic acid polymerization reaction system, which executes two polymerization procedures. The polylactic acid polymerization apparatus provided in the present application is used for the second polymerization procedure of the system. The resultant melt after the first polymerization procedure enters the polymerization reactor 10 through the melt inlet 11, is agitated by the agitating assembly 20, and then is outputted through the melt outlet 12, and reaches to the downstream for a monomer removal procedure and a pelleting procedure. The polylactic acid polymerization reaction system provided by the present invention can improve the polymerization effect and thereby improve the product conversion ratio.

While the present invention is described above in detail in some preferred embodiments with reference to the accompanying drawings, the present invention is not limited to those embodiments. Various simple variations may be made to the technical scheme of the present invention within the technical concept of the present invention. The specific technical features included in the present invention may be combined in any appropriate way. To avoid unnecessary repetition, the possible combinations are not described specifically in the present invention. However, such simple variations and combinations shall also be deemed as having been disclosed and falling in the scope of protection of the present invention.

The invention claimed is:

1. A polylactic acid polymerization reaction apparatus, comprising a polymerization reactor (10) and an agitating assembly (20) arranged in a flow channel of the polymerization reactor (10), wherein the agitating assembly (20) comprises an electromagnetic winding mechanism and a magnetic induction element (21), the electromagnetic winding mechanism is arranged along the inner wall of the polymerization reactor (10) around the magnetic induction element (21), with clearance formed between the electromagnetic winding mechanism and the magnetic induction element (21), so that the magnetic induction element (21) and the electromagnetic winding mechanism are able to induce electromagnetic induction, and thereby the magnetic induction element (21) is rotatable around its own axis; a threaded groove is formed on the magnetic induction element (21), the polylactic acid polymerization reaction apparatus further comprises a circulation pipe (31) and a static mixer (32) and a circulation pump (33) that are arranged on the circulation pipe (31), wherein two ends of the circulation pipe (31) are respectively in fluid communication with the portions of the polymerization reactor (10) at the two sides of the agitating assembly (20).

2. The polylactic acid polymerization reaction apparatus of claim 1, wherein the magnetic induction element (21) is in a cylindrical shape, and the axis of the magnetic induction element (21) and the axis of the polymerization reactor (10) are in the same line.

3. The polylactic acid polymerization reaction apparatus of claim 1, wherein the electromagnetic winding mechanism comprises a coil former (22) and an electromagnetic coil (23) wound on the coil former (22), wherein the coil former (22) is annular and fixedly arranged on the inner wall of the polymerization reactor (10).

4. The polylactic acid polymerization reaction apparatus of claim 1, wherein the magnetic induction element (21) comprises a main body portion and a tip portion, which are sequentially arranged in a melt flow direction, wherein the main body portion is cylindrical, and the tip portion is conical and tapered in the melt flow direction.

5. The polylactic acid polymerization reaction apparatus of claim 4, wherein the tip portion protrudes from the electromagnetic winding mechanism.

6. The polylactic acid polymerization reaction apparatus of claim 1, wherein the magnetic induction element (21) is made of 38CrMoAl material.

7. The polylactic acid polymerization reaction apparatus of claim 1, wherein the polymerization reactor (10) comprises an outer shell and an inner shell, a heat exchange liquid circulation cavity (40) is formed between the outer shell and the inner shell, a heat exchange liquid inlet (41) and a heat exchange liquid outlet (42) in communication with the heat exchange liquid circulation cavity (40) are arranged on the outer shell, and the agitating assembly (20) is arranged in the inner shell.

8. The polylactic acid polymerization reaction apparatus of claim 1, wherein the polymerization reactor (10) is arranged vertically, and comprises a melt inlet (11) at the bottom and a melt outlet (12) at the top.

9. The polylactic acid polymerization reaction system, comprising the polylactic acid polymerization reaction device of claim 1.

* * * * *